United States Patent
Igl

(10) Patent No.: US 7,543,431 B2
(45) Date of Patent: Jun. 9, 2009

(54) MOWER BLADE LOCKING JOINT

(75) Inventor: Bradley Robert Igl, Charlotte, NC (US)

(73) Assignee: Deere & Company, Moline, IL (US)

( * ) Notice: Subject to any disclaimer, the term of this patent is extended or adjusted under 35 U.S.C. 154(b) by 98 days.

(21) Appl. No.: 11/032,809

(22) Filed: Jan. 11, 2005

(65) Prior Publication Data

US 2006/0150609 A1      Jul. 13, 2006

(51) Int. Cl.
  *A01D 34/00*      (2006.01)
(52) U.S. Cl. .............. 56/17.5; 56/255; 56/295; 56/DIG. 17
(58) Field of Classification Search .......... 56/255, 56/295, DIG. 17, DIG. 19, DIG. 20, 17.5
See application file for complete search history.

(56) References Cited

U.S. PATENT DOCUMENTS

| | | | | |
|---|---|---|---|---|
| 3,078,573 A * | 2/1963 | Kern | .......... | 30/347 |
| 3,465,508 A | 9/1969 | Edwards | .......... | 56/295 |
| 3,477,214 A * | 11/1969 | Rogers | .......... | 56/295 |
| 3,564,824 A | 2/1971 | Tygh, Jr. | .......... | 56/295 |
| 4,302,878 A | 12/1981 | Bonforte | .......... | 30/347 |
| 4,726,176 A * | 2/1988 | McGrew | .......... | 56/12.7 |
| 4,936,884 A | 6/1990 | Campbell | .......... | 56/12.7 |
| 5,284,006 A | 2/1994 | Sheldon | .......... | 56/255 |
| 5,454,216 A | 10/1995 | Myszka | .......... | 56/17.5 |
| 5,473,873 A | 12/1995 | Sheldon | .......... | 56/255 |
| 5,502,958 A * | 4/1996 | Plamper | .......... | 56/17.5 |
| 5,724,796 A | 3/1998 | Plamper | .......... | 56/17.5 |
| 5,881,540 A | 3/1999 | Miller | .......... | 56/17.5 |
| 5,946,895 A | 9/1999 | Martens | .......... | 56/17.5 |
| 6,722,114 B1 * | 4/2004 | Poole et al. | .......... | 56/295 |
| 6,769,236 B2 * | 8/2004 | Schaedler | .......... | 56/295 |

* cited by examiner

*Primary Examiner*—Alicia M Torres

(57) ABSTRACT

A mower blade locking joint for fastening and securing a rotary cutting blade to a vertically aligned spindle driven by an engine. The spindle extends below a mower deck. The blade has a pair of opposing cutting ends and a mounting hole between the cutting ends. The joint includes a threaded section, a lobed section, and a collar. At least one of the spindle and the mounting hole have seven lobes. The lobes have continuous radii, an inner or minor diameter, and an outer or major diameter. The outwardly directed lobes have the same dimensions as the inwardly directed lobes, and both the spindle and the blade have the same cross sectional or surface area. The inner or minor diameters of the spindle and mounting hole are at least 75% of the major or outer diameters.

16 Claims, 1 Drawing Sheet

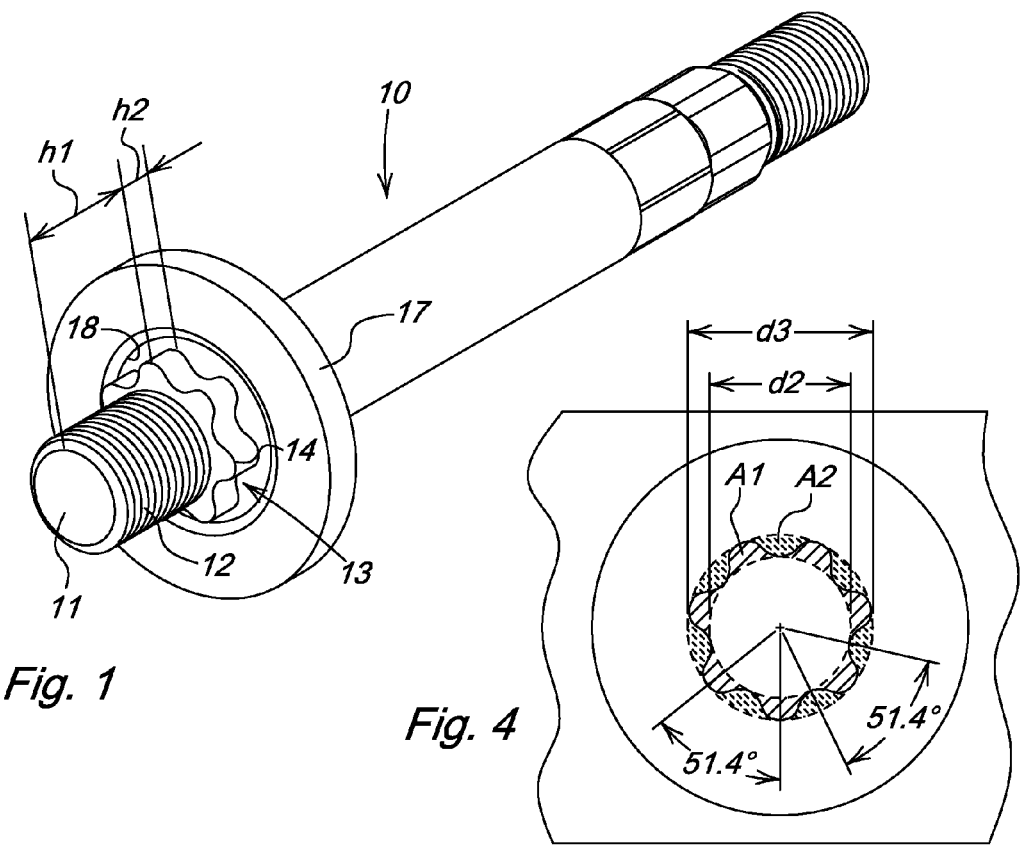
Fig. 1
Fig. 4
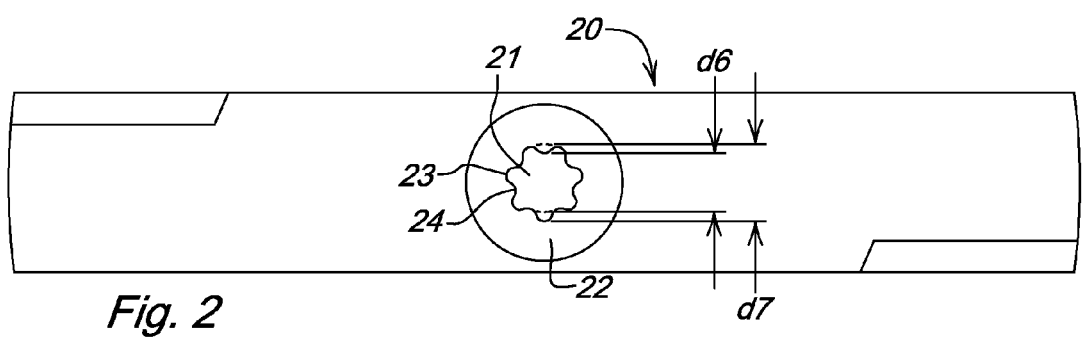
Fig. 2
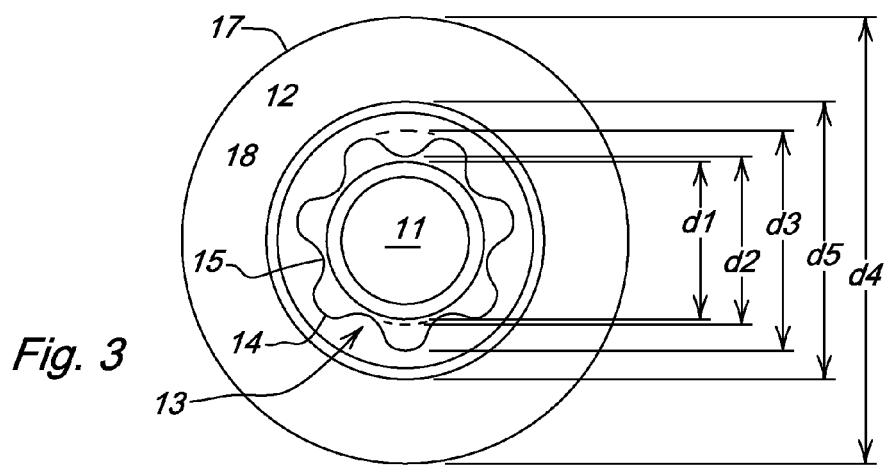
Fig. 3

MOWER BLADE LOCKING JOINT

FIELD OF THE INVENTION

This invention relates generally to grass and vegetation mowing equipment, and more specifically to mower blade locking joints to connect rotary cutting blades to vertically aligned spindles.

BACKGROUND OF THE INVENTION

Grass and vegetation mowing equipment may use one or more rotary cutting blades attached to vertically oriented spindles and suspended under a deck. The blade may be fastened to the bottom end of a spindle by a threaded bolt that extends through a mounting hole in the blade, or a nut may be fastened to the threaded end of the spindle. However, the bolt or nut may tighten or loosen during normal use. This may occur when the mower drive engages the spindle, or if the blade impacts an object during operation. If the bolt or nut tightens during use, it may become difficult to remove the blade from the spindle for service. If the bolt or nut loosens during use, there is a risk that the blade will cause injury or damage.

Several mower blade joint designs also have locked the blade to the spindle or provided an adapter to help lock the blade to the spindle. For example, U.S. Pat. No. 3,465,508 entitled Power Transmitting Means relates to a universal adapter in which the spindle or driving member is elliptical, square, or star-shaped. U.S. Pat. No. 3,564,824 entitled Rotary Mower Blade relates to a blade and adapter having a circular mounting hole with four opposing notches. U.S. Pat. No. 4,302,878 entitled Cutting Blade relates to a blade having a mounting hole with a plurality of inwardly extending wedge or trapezoidal shape members. U.S. Pat. No. 4,936,884 entitled Grass Cutting Device relates to a toothed retainer that fits into a notched mounting hole in the blade. U.S. Pat. Nos. 5,284,006 and 5,473,873, both entitled Combination Mower Blade, relate to a mower blade having a mounting hole with five petal-like keyways that engage matching keys of the shaft. U.S. Pat. No. 5,454,216 entitled Spindle For Mower Deck relates to a spindle having a raised section formed into a six-pointed toothed star. U.S. Pat. No. 5,724,796 entitled Mowing Blade With Star relates to a blade adapter with an asymmetrical star section. U.S. Pat. No. 5,881,540 entitled Mounting Member For Mower Blade Spindle relates to a spindle having a threaded portion and a raised section with a six-pointed toothed star shape. U.S. Pat. No. 5,946,895 entitled Adapter For Mowing Blade With Star relates to a blade adapter having a circular central section with four protruding asymmetrical teeth.

Several problems have been encountered with existing mower blade locking joints. The teeth or splines on the spindle and/or blade mounting hole may lack sufficient strength to withstand high impact forces if the mower blade strikes a stationary or solid object. Insufficient strength of prior art mower blade locking joints may be due, at least in part, to low contact area between the teeth or splines of the spindle and the blade mounting hole. Contact area also may be low if the blade is rotated slightly with respect to the spindle, or if there is a slight mismatch in the tooth profile of the spindle and that of the mower blade mounting hole. The spindle teeth or splines may yield before the mower blade because the spindle has lower hardness than the mower blade.

Additionally, the cross sectional area of the teeth or splines on a spindle may be smaller within the contact region of the joint than the cross sectional area of the mower blade. As a result, the teeth or splines on the spindle may yield or distort, and in some cases may shear off. This can make it difficult to remove or install the mower blades for service. If the teeth or splines become damaged or shear off, the joint may lose the locking capability to prevent the blade from turning relative to the spindle bolt.

An improved mower blade locking joint is needed to lock the mower blade to the spindle. An improved mower blade locking joint is needed to prevent the blade from rotating relative to the spindle bolt, and to prevent over-tightening or loosening of the joint during operation. A mower blade locking joint is needed that simplifies blade removal and installation for service. A mower blade locking joint is needed that provides higher strength to withstand impact forces if the mower blade strikes an object. A mower blade locking joint is needed without teeth or splines that may yield, distort, or shear off.

SUMMARY OF THE INVENTION

An improved mower blade locking joint is provided for locking a rotary mower blade to a spindle. The locking joint prevents the blade from rotating relative to the spindle bolt, and prevents over-tightening or loosening of the joint during operation. The locking joint simplifies removal and installation of the blade for service. Additionally, the locking joint provides high strength to withstand impact forces if the mower blade strikes an object.

The first end of the spindle has a threaded section, a lobed section, and a collar. The lobed section has a plurality of outwardly directed lobes with continuous radii, and preferably seven lobes. The lobed section may have a minor diameter and a major diameter, the minor diameter being at least 75% of the major diameter.

The mower blade mounting hole has a plurality of inwardly directed lobes having continuous radii. The locking joint provides high strength because the cross sectional or surface area of the outwardly extending lobes on the spindle is equal or substantially equal to the cross sectional or surface area of the inwardly extending lobes on the blade.

BRIEF DESCRIPTION OF THE DRAWINGS

FIG. 1 is a perspective view of the mower blade locking joint on a spindle according to a first embodiment of the invention.

FIG. 2 is a bottom view of a mower blade for use with a first embodiment of the mower blade locking joint of FIG. 1.

FIG. 3 is a bottom view of the first embodiment of the mower blade locking joint.

FIG. 4 is a bottom view of the locking joint showing the cross sectional area of the lobed section of the spindle and blade mounting hole.

DESCRIPTION OF THE PREFERRED EMBODIMENT

In one embodiment, shown in FIGS. 1-4, the mower blade locking joint connects mower blade 20 to spindle 10. Spindle 10 may have a generally vertical axis extending under a mower deck (not shown), and mower blade 20 may be positioned under the deck in a horizontal plane. Spindle 10 may be integral with a drive shaft connected to and driven by an internal combustion engine or other power source on the deck, or alternatively may be connected by one or more belts and pulleys to a driven shaft. When spindle 10 is rotated or braked, torque passes between the spindle and mower blade 20 attached and secured to first end 11 of the spindle. The mower blade may have a pair of opposing cutting ends designed to cut grass or other vegetation.

In one embodiment, first end 11 of spindle 10 may include externally threaded section 12, lobed section 14 and collar 17. A mower blade may be connected to the spindle by tightening a nut or other internally threaded fastener to externally threaded section 12. Lobed section 13 may have a plurality of outwardly directed lobes 14, and a trough or recess 15 between each lobe. The lobes may prevent the blade from rotating relative to the spindle, and also may prevent overtightening or loosening of the blade from the spindle during use. Collar 17 may be generally cylindrical shaped and may have a larger outer diameter than the lobed section. Additionally, collar 17 may have an internal recess 18. Collar 17 and recess 18 may help to position blade 20 horizontally and flat, and also may limit lateral flexing of the blade.

In one embodiment, mower blade 20 has a mounting hole 21 positioned centrally and spaced between the blade's opposing cutting ends. Mounting hole 21 may have a plurality of inwardly directed lobes 24 that are dimensioned to fit within troughs or recesses 15 on spindle 10. Outwardly directed lobes 14 on the spindle are dimensioned to fit within troughs or recesses 23 on the blade.

In one embodiment, lobed section 13 of spindle 10 has seven outwardly directed lobes 14, and seven troughs or recesses 15. The lobes may be spaced equally around the circumference of the spindle's vertical axis, so that adjacent outwardly directed lobes, and adjacent troughs, are positioned at regular intervals of 51.4 degrees around the circumference. The mower blade may have seven inwardly directed lobes 24, and seven troughs or recesses 23. As shown in FIG. 4, each of the lobes may be positioned 51.4 degrees from each adjacent lobe, and each trough may be positioned 51.4 degrees from each adjacent trough.

In an alternative embodiment (not shown), a mower blade having a mounting hole with less than seven inwardly directed lobes may be connected to spindle 10. Alternatively, mower blade 20 may be connected to a spindle having less than seven outwardly directed lobes. A spindle or blade mounting hole with less than seven lobes may have the lobes positioned 51.4 degrees or a multiple of 51.4 degrees from the other lobes.

In one embodiment, the lobes and troughs or recesses on the spindle may have a shape and/or profile with continuous radii and continuous curved surfaces. The lobes and troughs may have no corners, straight sides or edges. Similarly, every lobe and trough or recess on the blade also may have a shape and/or profile with continuous radii and continuous curved surfaces, without corners, straight sides or edges.

In one embodiment, as shown in more detail in FIG. 4, the total cross sectional or surface area A1 of the outwardly extending lobes 14 on the spindle may be the same or substantially the same (i.e., within about 5%) as the total cross sectional or surface area A2 of the inwardly extending lobes 24 on the blade. Additionally, the cross sectional or surface area of each outwardly extending lobe on the spindle may be the same or substantially the same as the cross sectional or surface area of each inwardly extending lobe on the blade.

Similarly, in one embodiment, the total cross sectional or surface area of the troughs or recesses 15 on the spindle may be the same or substantially the same as the total cross sectional or surface area of the troughs or recesses 23 on the blade. The cross sectional or surface area of each trough or recess on the spindle may be the same or substantially the same as the cross sectional or surface area of each trough or recess on the blade.

Additionally, in one embodiment, the total cross sectional or surface area of the lobes may be the same or substantially the same as the cross sectional or surface area of the troughs or recesses, on both the spindle and the blade. The cross sectional or surface area of each lobe also may be the same or substantially the same as the cross sectional or surface area of each trough or recess.

In one embodiment, the locking joint can withstand high impact forces before yielding because the spindle and blade mounting hole have the same or substantially the same cross sectional or surface area within the joint. As described above, for example, each outwardly directed lobe 14 may have the same dimensions as each inwardly directed lobe 24. Additionally, the total or combined cross sectional or surface area A1 of the outwardly directed lobes may be the same or substantially the same (i.e., within plus or minus 5%) as the total or combined cross sectional or surface area A2 of the inwardly directed lobes. The cross sectional or surface area may be defined as the area within the locking joint. For example, it may be the area between the inner or minor diameter d2 and the outer or major diameter d3 of the lobed section of the spindle and blade. As a result, the cross sectional or surface area of the lobed section of the spindle (measured between the outwardly directed lobes 14 and troughs 15) is the same as the cross sectional or surface area of the blade mounting hole (measured between the inwardly directed lobes 24 and troughs 23).

In one embodiment, the continuous curved surfaces and/or continuous radii of the lobes for the locking joint of the present invention help enhance or increase the extent of contact between the spindle and blade. For example, the continuous curved surfaces and/or continuous radii of the lobed sections maximize contact even if the blade and its mounting hole may be rotated slightly (i.e., 1.5 degrees) with respect to the spindle, or if the dimensions of the troughs in the blade mounting hole are slightly larger than the outwardly extending lobes of the spindle.

In one embodiment, the continuous curved surfaces of the lobes help reduce contact stresses between the spindle and blade, especially those forces that occur on the joint if the mower blade may impact an object. The relative dimensions and surfaces of the blade and mounting hole help prevent damaging or shearing of the locking features of the joint, decreases wear of the joint over time, and allows the spindle and blade to have similar shear strengths.

In an alternative embodiment (not shown), the spindle may have an internally threaded section instead of externally threaded section 12. In such an alternative embodiment, a bolt (not shown) may be inserted through mounting hole 21 in mower blade 20 and engage an internally threaded area at the first end of the spindle. The bolt may be tightened against the mower blade so that the blade mounting hole 21 may engage the lobed section of the spindle.

In one embodiment, as shown in FIG. 3, threaded section 12 of spindle 10 may have an outer diameter d1 of between about 12 mm and about 16 mm, or between about 0.500 inches (12.7 mm) and about 0.625 inches (15.875 mm). The threaded section may have a height or axial length h1 of between about 0.500 inches (12.700 mm) and about 0.750 inches (19.050 mm).

In one embodiment, the mower blade locking joint of the present invention may provide a greater clamping load than previous joints. For example, the threaded section may have a diameter of 12 mm, providing about 33% more clamping load than a 16 mm outer diameter threaded section for the same applied torque. The relative dimensions of the lobed sections of the spindle and the blade makes it desirable to use a smaller diameter threaded section.

In one embodiment, lobed section 13 may have an inner or minor diameter d2 of about 0.669 inches (17.000 mm) and an outer or major diameter d3 of about 0.875 inches (22.230 mm). Thus, the diameter of troughs or recesses 15 may be about 0.669 inches (17.000 mm) and the diameter of the outwardly directed lobes 14 may be about 0.875 inches (22.230 mm).

In one embodiment, the inner or minor diameter d2 of lobed section 13 may be at least 75% of the major or outer diameter d3. For example, the inner or minor diameter d2 of 0.669 inches (17.000 mm) is 76.5% of the outer or major diameter d3 of 0.875 inches (22.230 mm). The lobed section may have a height or axial length h2 of between about 0.100 inches (2.540 mm) and about 0.250 inches (6.350 mm).

In one embodiment, collar 17 may have an outer diameter d4 of between about 1.500 inches (38.100 mm) and about 3.000 inches (76.200 mm), and a height or axial length h3 of between about 0.100 inches (2.540 mm) and about 0.500 inches (12.700 mm).

In one embodiment, recess 18 may have a diameter d5 greater than the outer or major diameter d3 of lobed section 13. For example, diameter d5 of recess 18 may be between about 0.875 inches (22.230 mm) and about 1.250 inches (31.750 mm).

In one embodiment, blade 20 has a mounting hole 21 having an inner or minor diameter d6 of 0.677 inches (17.200 mm), and an outer or major diameter d7 of 0.883 inches (22.430 mm). Thus, the diameter of the inwardly directed lobes 24 may be 0.677 inches (17.200 mm) and the diameter of troughs or recesses 25 may be 0.883 inches.

In one embodiment, the inner or minor diameter d6 may be at least about 75% of the outer or major diameter d7. For example, the inner or minor diameter d6 of 0.677 inches is 76.7% of the outer or major diameter d7 of 0.883 inches.

In one embodiment, blade 20 also may have a flat contact surface 22 around the mounting hole that matches collar 17. The blade thickness may be within about 25% of the thickness of the lobed section 13 of the spindle.

In one embodiment, the shape, dimensions, profile and cross sectional or surface area of each lobe 14 on spindle 10 may be the same or not more than about 5% smaller than the cross sectional or surface area of each trough or recess 23 on blade 20. For example, the diameter of each lobe 14 on spindle 10 may be about 0.200 mm less than the corresponding diameter of trough or recess 23 on blade 20.

In one embodiment, as shown in FIG. 4, the cross sectional or surface area A1 of the lobes on the spindle and the cross sectional or surface area A2 of the lobes on the mounting hole are equal or substantially equal, both areas being between about 0.250 square inches (about 160 mm$^2$) and about 0.300 square inches (about 193 sq. mm$^2$), and most preferably between about 0.270 square inches (about 174 sq. mm$^2$) and about 0.290 square inches (about 187 sq mm$^2$). In FIG. 4, the cross sectional or surface area of the lobes is defined and measured as the area between the inner or minor diameter d2, and the outer or major diameter d3, of the lobed sections of the spindle and the mower blade mounting hole.

Having described the preferred embodiment, it will become apparent that various modifications can be made without departing from the scope of the invention as defined in the accompanying claims.

The invention claimed is:

1. An apparatus comprising:
   a rotatable spindle having a vertical axis and having a first end under a mower deck; the first end having a threaded section, a lobed section, and a collar; the lobed section having a plurality of outwardly directed lobes and a recess between each lobe, the lobes and recesses having completely continuous radii and completely continuous curved surfaces, each lobe having a cross sectional area and each recess having a cross sectional area that is within 5% of being equal to the cross sectional area of each lobe.

2. The apparatus of claim 1 further comprising seven outwardly directed lobes.

3. The apparatus of claim 1 wherein the lobed section has a minor diameter and a major diameter, the minor diameter being at least 75 % of the major diameter.

4. The apparatus of claim 1 further comprising a mower blade having a mounting hole having a plurality of inwardly directed lobes with completely continuous radii.

5. The apparatus of claim 4 wherein the cross sectional area of the lobed section of the spindle is within 5 % of being equal to the cross sectional area of the mounting hole.

6. The apparatus of claim 1 further comprising a recess in the collar.

7. A mowing blade comprising:
   an oblong metal bar having a pair of opposing cutting ends;
   a mounting hole between the opposing cutting ends; and
   a plurality of outwardly directed lobes in the mounting hole; each of the outwardly directed lobes positioned a multiple of about 51.4degrees from each of the other outwardly directed lobes; and
   a trough between each lobe; the troughs having cross sectional area that is within 5% of being equal to the cross sectional area of the lobes; the lobes and the troughs having completely continuous curved surfaces without straight sides.

8. The mowing blade of claim 7 further comprising seven outwardly directed lobes and seven troughs.

9. The mowing blade of claim 7 wherein the mounting hole has a inner or minor diameter and an outer or major diameter; the inner or minor diameter being at least 75% of the major or outer diameter.

10. An apparatus comprising:
    a vertically aligned spindle driven by an engine; the spindle extending below a mower deck;
    a rotary cutting blade having a pair of opposing cutting ends and a mounting hole between the cutting ends; and
    a joint fastening the blade to the spindle; the joint including a threaded section to tighten the blade to the spindle, and a plurality of outwardly directed lobes and inwardly directed lobes; each of the outwardly directed lobes having a cross sectional area within 5% of the cross sectional area of each of the inwardly directed lobes; the outwardly directed lobes and inwardly directed lobes having a profile with completely continuous radii and completely continuous curved surfaces.

11. The apparatus of claim 10 further comprising a collar around the spindle and adjacent the lobes.

12. The apparatus of claim 11 further comprising an internal recess in the collar, the recess having a diameter greater than the outwardly directed lobes.

13. The apparatus of claim 10 further comprising seven outwardly directed lobes and seven inwardly directed lobes.

14. The apparatus of claim 10 wherein the threaded section has an outer diameter of less than 16mm.

15. The apparatus of claim 10 further comprising a plurality of outwardly directed lobes on the spindle and inwardly directed lobes on the mounting hole.

16. The apparatus of claim 10 wherein the diameter of the inwardly directed lobes is at least 75% of the diameter of the outwardly directed lobes.

\* \* \* \* \*